United States Patent
Roseman et al.

(10) Patent No.: US 9,547,976 B1
(45) Date of Patent: Jan. 17, 2017

(54) DEVICE TO ALERT DRIVERS TO THE POSSIBILITY OF FORGETTING OBJECTS IN VEHICLE

(71) Applicants: Bruce Roseman, White Plains, NY (US); Daniel Roseman, White Plains, NY (US)

(72) Inventors: Bruce Roseman, White Plains, NY (US); Daniel Roseman, White Plains, NY (US)

( * ) Notice: Subject to any disclaimer, the term of this patent is extended or adjusted under 35 U.S.C. 154(b) by 0 days.

(21) Appl. No.: 14/752,272

(22) Filed: Jun. 26, 2015

(51) Int. Cl.
| | |
|---|---|
| G08B 21/00 | (2006.01) |
| G08B 21/24 | (2006.01) |
| B60Q 5/00 | (2006.01) |
| B60R 16/03 | (2006.01) |
| G08B 3/10 | (2006.01) |
| G08B 21/22 | (2006.01) |
| B60N 2/26 | (2006.01) |
| B60N 3/14 | (2006.01) |

(52) U.S. Cl.
CPC .............. *G08B 21/24* (2013.01); *B60N 2/26* (2013.01); *B60Q 5/005* (2013.01); *B60R 16/03* (2013.01); *G08B 3/10* (2013.01); *G08B 21/22* (2013.01); *B60N 3/14* (2013.01)

(58) Field of Classification Search
CPC ......... G08B 21/24; G08B 21/22; B60N 2/002; B60N 2/26

USPC .............. 340/686.1, 457; 180/273
See application file for complete search history.

(56) References Cited

U.S. PATENT DOCUMENTS

| | | | | |
|---|---|---|---|---|
| 7,319,382 | B1* | 1/2008 | Vu ............... | B60N 2/002 340/457 |
| 7,457,695 | B1* | 11/2008 | Fields ............ | B60N 2/002 180/273 |
| 8,768,292 | B2* | 7/2014 | Welch ............ | B60N 2/002 455/404.2 |
| 9,327,645 | B2* | 5/2016 | Raman ........... | G08B 21/24 |
| 2005/0083190 | A1* | 4/2005 | James ............ | G08B 21/24 340/457 |
| 2006/0290319 | A1* | 12/2006 | Burgan .......... | G08B 21/24 320/104 |

\* cited by examiner

*Primary Examiner* — John A Tweel, Jr.

(57) ABSTRACT

A device designed to help people from forgetting objects in vehicles. The device includes a central unit, a power cable, and a conducting insert that closes a circuit. The central unit includes a. case that houses the circuit with an internal power source, a buzzer, a switch, and a relay. The circuit is disconnected and when the conducting insert is inserted, it bridges the switch and completes the circuit. The power cable has a plug on one end and a car charger plug on the other. When the vehicle is running and the car charger plug is plugged into the cigarette charger socket, the plug is powered. When the plug is plugged into the relay in powering mode, the circuit is opened. If the plug is in non-powering mode, the relay will remained closed and the circuit will remain completed at this point.

1 Claim, 1 Drawing Sheet

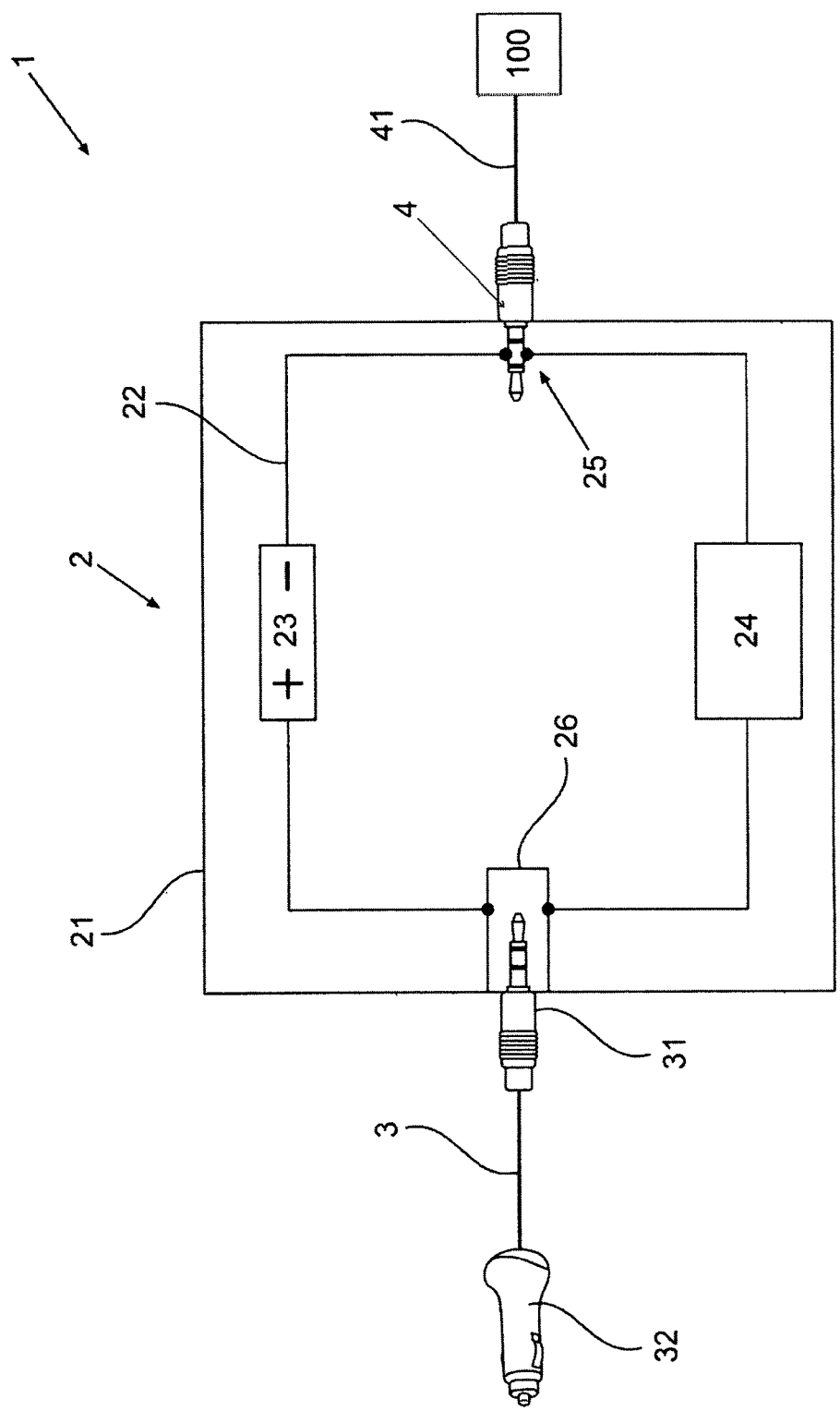

DEVICE TO ALERT DRIVERS TO THE POSSIBILITY OF FORGETTING OBJECTS IN VEHICLE

TECHNICAL FIELD

The present invention refers to a device designed to alert a driver to the possibility of forgetting a baby or an object in the vehicle so as to prevent that from happening.

BACKGROUND ART

Unfortunately, we have all heard of cases in which drivers or responsible adults have inadvertently forgotten a baby in a vehicle, an event that occasionally ends in a tragic result. In addition, people also forget objects, such as expensive devices, bags containing valuables, briefcases containing important documents, laptops containing sensitive information, in their vehicles. Many devices and accessories are currently available that are designed to prevent drivers and responsible adults from forgetting babies and other objects in vehicles. Most of these devices and accessories, however, include expensive components, are cumbersome to install, and are designed in ways that inhibit easy, simple, and routine operation and use thereof. The present invention describes a device designed to alert the driver to the possibility of forgetting a baby or an object in the vehicle so as to prevent that from happening.

LIST OF DRAWINGS

The intention of the drawings attached to the application is not to limit the scope of the invention and its application. The drawings are intended only to illustrate the invention and they constitute only one of its many possible implementations.

FIG. 1 is a schematic description of the alert device (1) that includes a central unit (2), a power cable (3), and a conducting insert (4) that closes the electrical circuit (22).

THE INVENTION

The main objective of the present invention is to provide an alert device (1) for use in vehicles, that is designed to alert the driver to the possibility of forgetting an object or a baby in the vehicle.

The alert device (1) comprises a central unit (2), a power cable (3), and a conducting insert (4) that closes an electrical circuit. FIG. 1 presents a schematic description of the alert device (1). The central unit (2) comprises a case (21) that contains an electrical circuit (22) with an internal power source (23), an electronic buzzer (24), a switch (25), and a miniature power relay (26).

The case (21) can be a compact molded plastic case into which the components of the central unit (2) are integrated. The case (21) has several apertures: one that enables the electronic buzzer's buzzing sound to be emitted from within the case, one that is an inlet for the conducting insert (4) that bridges the switch (25) and closes the electrical circuit, and another that is an inlet for the plug (31) at the end of the power cable (3). The internal power source (23) can be a miniature battery. The power cable (3) has a plug (31) at one end and a car charger plug (32) that fits into a standard vehicle cigarette lighter socket. When the vehicle is running and the car charger plug (32) is in the cigarette lighter socket, the plug (31) can deliver electricity (a state hereinafter referred to as "powering mode").

Closing and opening the electrical circuit (22): The conducting insert (4) that closes the electrical circuit (22) is inserted into the aperture in the case (2) such that it bridges the switch (25) and closes the electrical circuit (22). When the conducting insert (4) is not inserted into the central unit (2), the electrical circuit is open (the switch (25) is in open position) and so the electronic buzzer (24) does not buzz. When the power cable (3) is in powering mode and the plug (31) is plugged into the relay (26), the relay opens, thus breaking the electrical circuit (22) (the circuit is now in open position) and so the electronic buzzer (24) does not buzz regardless of whether the conducting insert (4) is inserted into the central unit (2). When the plug (31) is inserted into the relay (26), but the power cable (3) is in non-powering mode, the electrical circuit (22) remains closed at the relay point, and the electrical circuit (22) will be open or closed subject to the position of the switch (25).

In other words, the electrical circuit (22) is closed, and consecquently the buzzer (24) will buzz, only when the conducting insert (4) is connected to the central unit (2) AND, eighter the plug (31) is not connected to the central unit (2), or, the plug (31) is connected but it is in a non-powereing mode.

The conducting insert (4) should be attached to the object (100) that the user wishes not to forget in the vehicle, which may be, for instance, a baby's car seat, a briefcase containing documents, a bag containing valuables, a laptop containing sensitive information, or any other relevant object. This may be achieved by using a string (41) that is attached to the object (100) with a safetypin, a strap, or any other attaching means. The central unit (2) may be hung, affixed or attached to any location in the vehicle that the driver finds convenient, for instance, it may be hung on the back of the driver's seat.

Using the device (1): To demonstrate use of the device (1), we refer to the situation in which a driver who wishes to ensure he does not forget a baby in the vehicle. The baby's car seat may be already installed in the vehicle or the driver may be carrying the baby in a car seat from the home to the vehicle. In any case, the string (41) with the conducting insert (4) may already be attached to the car seat (100). When the driver opens the door and places the baby in the car seat or places the car seat with the baby in the vehicle, he sees the string (41) with the conducing insert (4) and is immediately reminded to insert the conduting insert (4) into the central unit (2). At that moment, the electrical circuit (22) is closed, and the electronic buzzer is activated (i.e. it buzzes). When the driver enters the vehicle and starts the motor running, the cigarette lighter socket becomes powered (has electrical voltage). If the plug (31) is plugged into the central unit (2), the electrical circuit (22) is disconnected (is open) and the buzzer stops buzzing. If the plug (31) is not plugged into the central unit (2), the buzzing sound reminds the driver to plug it in (otherwise the buzzing will continue!). When the trip is over and the driver turns the motor off, the cigarette lighter socket becomes unpowered (no electrical voltage), and as a result, the electrical circuit (22) closes [i.e. the relay (26) closes], and the electronic buzzer (24) begins to buzz again, reminding the driver that there is an object (100) in the vehicle that he should not forgot. Only when the driver removes the conducting insert (4) from the central unit (2), opening the electrical circuit, does the buzzer stop buzzing. The buzzing sound that reminds (and compels) the driver to remove the conducting insert (4) from the central unit (2) after the turnning off the vehicle motor, reduces the chance that he will forget the object, or baby, in the vehicle.

What is claimed is:

1. An alert device designed to alert a person to the possibility of forgetting an object in a vehicle, which comprises a central unit, a power cable, and a conducting insert that closes an electrical circuit;
   wherein the central unit includes a case that contains an internal power source, an electronic buzzer, a switch, and a relay;
   wherein the switch is disconnected in the switch area and when the conducting insert is inserted into the switch, the switch is bridged and the electrical circuit is completed at this point in the electritical circuit;
   wherein the power cable has an electrical plug on one end and a car charger plug on the other end; wherein when the vehicle is running and said car charger plug is plugged into the vehicle's cigarette lighter, the electrical plug is powered and when plugged into the relay, it breaks the electrical circuit in that area; wherein when the electrical plug is not plugged into the relay or when it is plugged in, but is not in powering mode, the relay is bridged and the electrical circuit is completed at this point in the electrical circuit.

* * * * *